United States Patent [19]

Murray et al.

[11] Patent Number: 4,484,758
[45] Date of Patent: Nov. 27, 1984

[54] SELF-STEERING TRAILER

[75] Inventors: Harley W. Murray, Stockton, Calif.; Howard P. Burnell, Calgary, Canada; David H. Murray, Stockton, Calif.

[73] Assignee: Harley Murray, Inc., Stockton, Calif.

[21] Appl. No.: 444,852

[22] Filed: Nov. 26, 1982

[51] Int. Cl.³ .............................................. B62D 13/04
[52] U.S. Cl. ................................. 280/442; 280/81 A; 280/DIG. 9
[58] Field of Search ............... 280/404, 419, 426, 442, 280/81 A, DIG. 14, DIG. 9

[56] References Cited

U.S. PATENT DOCUMENTS 2,557,471 6/1951 Romig et al. ............... 280/DIG. 14
3,438,652 4/1969 Hoffacker ..................... 280/423 A
3,883,158 5/1975 Fiske ............................. 280/426 X

FOREIGN PATENT DOCUMENTS 660550 5/1938 Fed. Rep. of Germany ...... 280/404

Primary Examiner—John A. Pekar
Attorney, Agent, or Firm—Flehr, Hohbach, Test, Albritton & Herbert

[57] ABSTRACT

Self-steering trailer having an elongated main frame, the rear end of which is supported by a sub-frame and steering dolly. The dolly is connected to the main frame in such manner that the dolly is automatically turned relative to the main frame in response to lateral movement of the rear end of the main frame to steer the rear of the trailer in accordance with the lateral movement. The steering means comprises an A-frame connected to the dolly, and a steering arm which interconnects the rear of the main frame and the dolly. In some embodiments, a manually controlled actuator is connected between the main frame and the dolly to permit the rear of the trailer to be steered manually.

17 Claims, 7 Drawing Figures

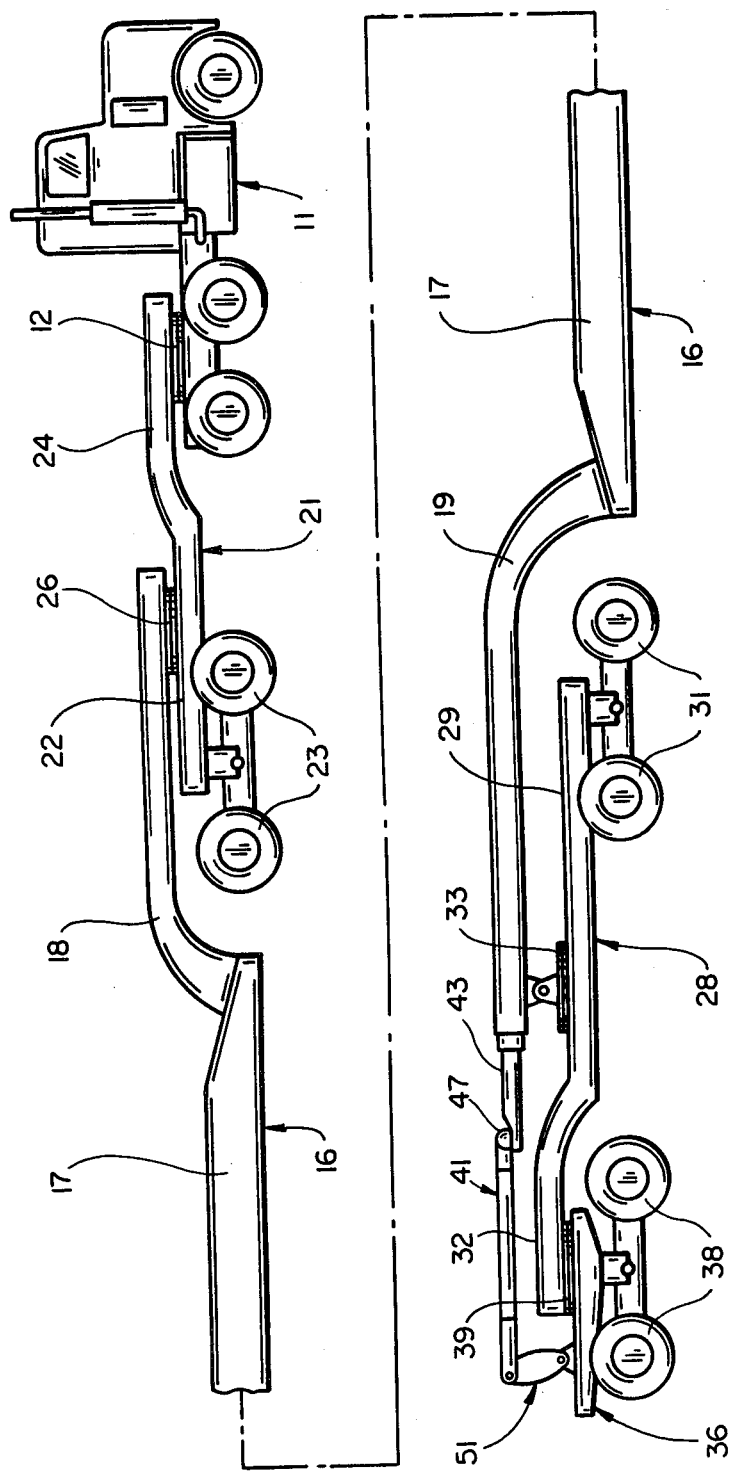

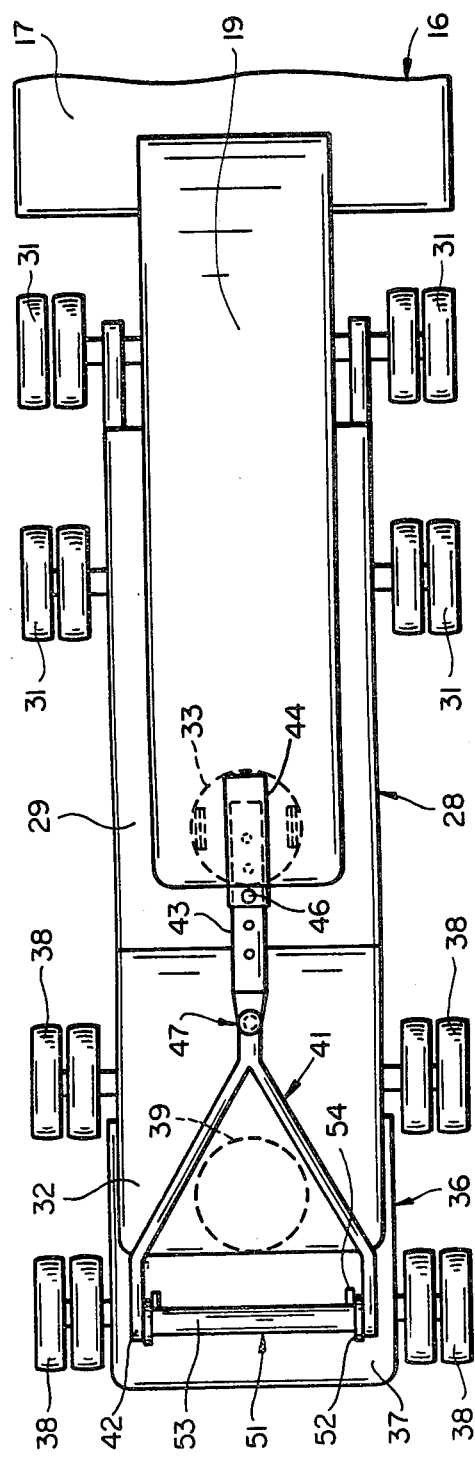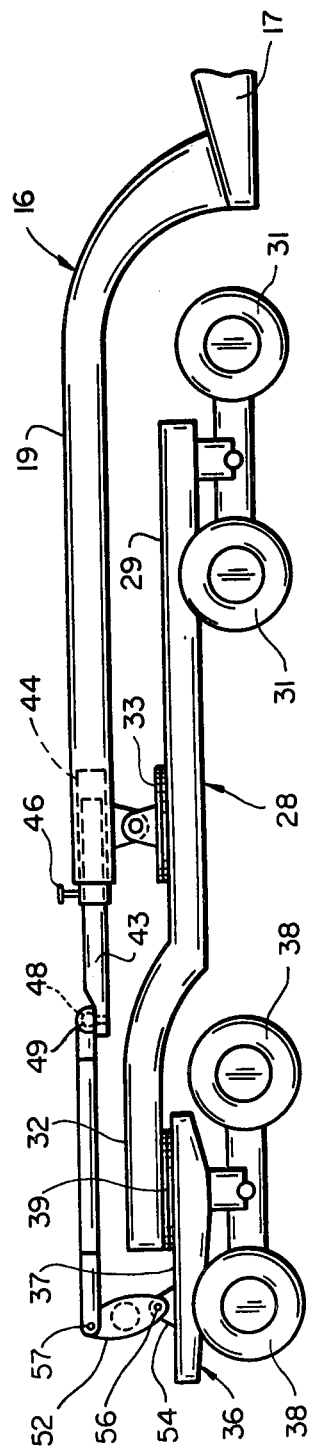
FIG_2
FIG_3

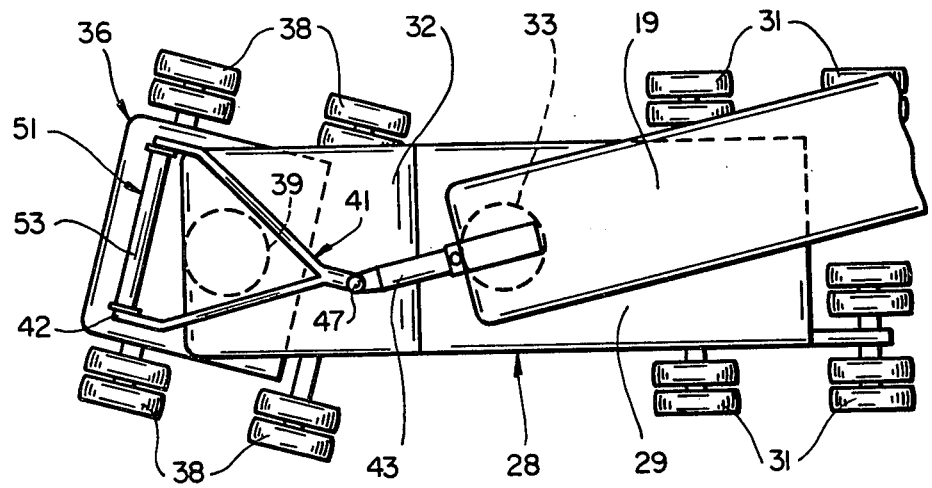
FIG_4
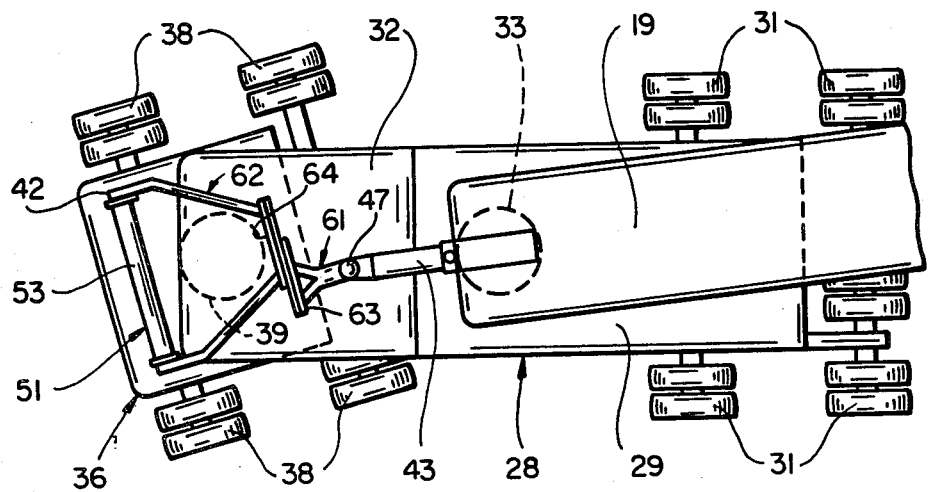
FIG_5

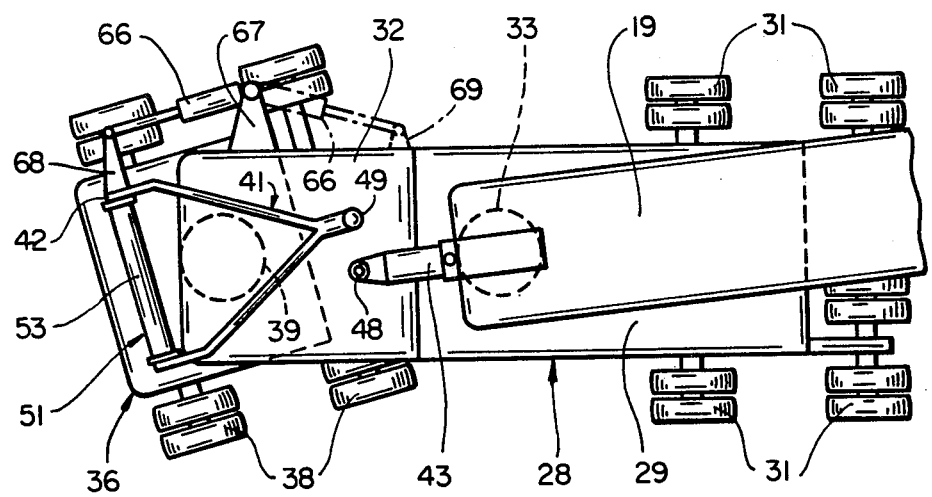
FIG_6
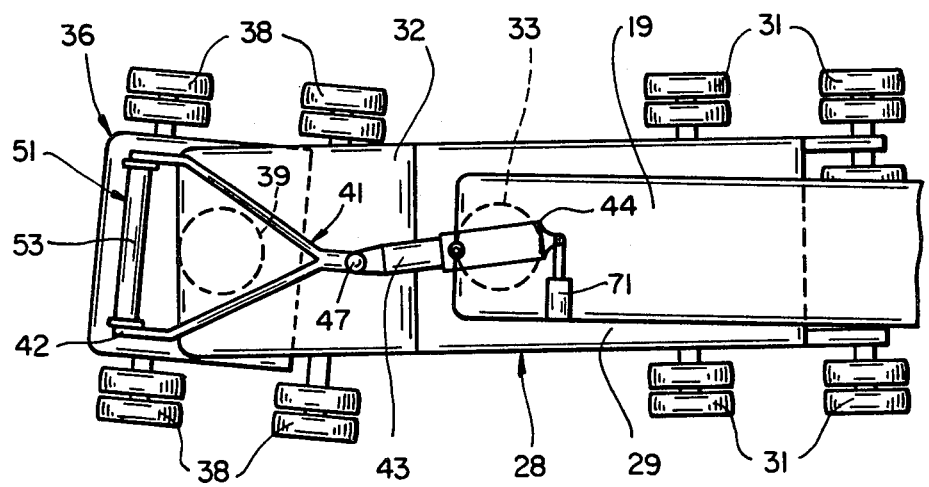
FIG_7

SELF-STEERING TRAILER

This invention pertains generally to wheeled vehicles, and more particularly to a self-steering trailer for carrying large construction equipment and other heavy or bulky loads.

Trailers employed for transporting large, heavy loads such as bulldozers and other large earthmoving equipment must necessarily be large and bulky themselves. A tractor-trailer rig for carrying a single piece of earthmoving equipment can, for example, be over 100 feet in length. Turning a trailer of this length presents certain problems, both on the highway and in off-road use. In simple pulling situations, the rear of the trailer has a tendency to cut across the corner when a turn is made, and this can make it very difficult to make turns with the trailer. In backing, it is difficult to control the direction of the trailer, particularly a trailer having the length and articulation required for carrying large construction equipment.

It is in general an object of the invention to provide a new and improved trailer for carrying large construction equipment and other heavy or bulky loads.

Another object of the invention is to provide a trailer of the above character which is self-steering in that the rear of the trailer is automatically steered around turns made by the trailer.

Another object of the invention is to provide a trailer of the above character in which the rear of the trailer can also be steered manually, if desired.

These and other objects are achieved in accordance with the invention by providing a trailer having an elongated main frame, the rear end of which is supported by a subframe and steering dolly. The dolly is connected to the main frame in such manner that the dolly is automatically turned relative to the main frame in response to lateral movement of the rear end of the main frame to steer the rear of the trailer in accordance with the lateral movement. The steering means comprises an A-frame connected to the dolly, and a steering arm which interconnects the rear of the main frame and the dolly. In some embodiments, a manually controlled actuator is connected between the main frame and the dolly to permit the rear of the trailer to be steered manually.

FIG. 1 is a side elevational view of one embodiment of a self-steering trailer according to the invention, illustrated in connection with a pulling vehicle.

FIG. 2 is an enlarged fragmentary top plan view of the embodiment of FIG. 1.

FIG. 3 is a fragmentary side elevational view of the embodiment of FIG. 1.

FIG. 4 is a fragmentary top plan view of the embodiment of FIG. 1, illustrating the operation thereof.

FIG. 5 is a fragmentary top plan view of another embodiment of a self-steering trailer incorporating the invention.

FIG. 6 is a fragmentary top plan view of another embodiment of a self-steering trailer incorporating the invention.

FIG. 7 is a fragmentary top plan view of another embodiment of a self-steering trailer incorporating the invention.

In FIG. 1, the invention is illustrated in connection with a pulling vehicle 11 which can be any suitable truck or tractor of conventional design. This vehicle has a conventional fifth wheel 12 to which the trailer is connected in load supporting relationship, as discussed more fully hereinafter.

The trailer comprises an elongated main frame 16 having a central deck portion 17 for preceding the equipment or other load to be carried. The front gooseneck 18 projects in a forward direction from the front end of deck section 17, and a rear gooseneck 19 projects in a rearward direction from the rear end of deck section 17. One or both of the goosenecks is detachably connected to the deck section to facilitate loading and unloading of the load to be carried. One suitable means for connecting a detachable gooseneck to the deck section is described in detail in U.S. Pat. No. 3,326,572.

The front of main frame 16 is supported by a subframe 21 commonly known as a jeep. This subframe includes a deck 22 which is positioned beneath front gooseneck 18 of the main frame, with ground engaging wheels 23 mounted on a pair of laterally extending axles toward the rear of the subframe. A gooseneck 24 extends in a forward direction from the front of deck 22 and is connected to the fifth wheel 12 of the pulling vehicle. A turntable 26 is mounted on deck 22, and the front gooseneck 18 of the main frame is connected to this turntable. Thus, the front end of main frame 16 is pivotally connected to the pulling vehicle in load supportive relationship.

A second subframe 28, similar to subframe 21, is provided at the rear of main frame 16. This subframe comprises a deck 29 positioned beneath rear gooseneck 19 of the main frame, with ground engaging wheels 31 on a pair of laterally extending axles beneath the deck. This subframe also includes a gooseneck 32 which projects rearwardly from deck 29. A turntable 33 is mounted on deck 29 above wheels 31, and the rear gooseneck 19 of the main frame is connected to this turntable.

The rear portion of subframe 28 is supported by a steering dolly 36 having a deck 37 supported by ground engaging wheels 38. A turntable 39 is mounted on the deck of the dolly, and the rearwardly extending gooseneck 32 of subframe 28 is connected to this turntable.

Means is connected between the rear portion of main frame 16 and dolly 36 for automatically steering the rear of the trailer around a turn. This means comprises an A-frame 41 having a pair of arms 42 connected to opposite sides of the dolly by an equalizer, and a steering arm 43 which is affixed to the rear gooseneck 19 of the main frame. The steering arm is slideably received in a box 44 and secured in the box by a lock pin 46. The box is positioned on the longitudinal center line of the gooseneck, and when the trailer is moving straight ahead, steering arm 43 is aligned with the longitudinal center line of main frame 16. A-frame 41 is pivotally connected to the rear end of steering arm 43 by means of a hitch 47 which can be selectively engaged and disengaged. This hitch comprises a ball 48 mounted on a flange at the rear of arm 43, and a socket 49 at the front of the A-frame.

The amount of steering provided can be adjusted by changing the length of arm 43, and the arm can be locked in a plurality of different positions in box 44 for this purpose. A-frame 41 is connected to the steering dolly by an equalizer 51 to compensate for changes in the length of the steering arm. The equalizer comprises a pair of side arms 52 which are rigidly connected together by a cross-member 53. The lower ends of the equalizer arms are pivotally connected to flanges 54 which extend upwardly from dolly 36 by pins 56, and the upper ends of the equalizer arms are pivotally connected to A-frame arms 42 by pins 57. Pins 56 lie on a laterally extending axis which remains stationary relative to the dolly, whereas pins 57 lie on a laterally extending axis which pivots about the axis of pins 56 in accordance with the length of the steering arm.

In operation and use, when the trailer is being pulled straight ahead, gooseneck 19 and steering arm 43 are aligned with the longitudinal center line of main frame 16, and dolly wheels 38 are pointed straight ahead. When the trailer is pulled around a turn, rear gooseneck 19 pivots on turntable 33, and steering arm 43 swings toward the outside of the turn, deflecting the front end of A-frame 41 in this direction. This turns dolly 36 about the axis of turntable 39, steering the rear of the trailer toward the outside of the turn.

In FIG. 4, the trailer is illustrated making a left turn, with gooseneck 19 pivoting in a counterclockwise direction about the axis of turntable 33 and dolly 36 pivoting in a clockwise direction about the axis of turntable 39. For a right turn, gooseneck 19 pivots in the clockwise direction, and the dolly pivots in the counterclockwise direction. The amount of steering produced by a given swing of the gooseneck can be increased by increasing the length of arm 43. Likewise, the amount of steering can be decreased by shortening the steering arm.

In the embodiment illustrated in FIG. 5, A-frame 41 is formed in two sections, and steering arm 43 can be displaced laterally relative to A-frame arms 42 for purposes of alignment and/or to provide some degree of manual steering. Front A-frame section 61 carries the socket 49 of hitch 47, and rear section 62 includes arms 42. Flanges 63, 64 are provided at the confronting ends of the A-frame sections, and the alignment between the dolly and the main frame is determined by the relative lateral positions of these flanges. If no manual steering ability is desired, the flanges can simply be bolted together. If manual steering is desired, the flanges can be interconnected by a hydraulic ram (not shown) or other suitable actuator which can be controlled from the cab of the truck.

In the embodiment of FIG. 6, A-frame 41 is disconnected from steering arm 43, and a manually controlled actuator 66 (such as a hydraulic ram) is connected between rear jeep 28 and steering dolly 36. One of end of the actuator is pivotally connected to a bracket 67 which projects laterally from one side of the rear subframe, and the other end of the actuator is pivotally connected to a bracket 168 which projects from equalizer 61. When the ram is not in use, it is disconnected from bracket 68 and connected to a storage bracket 69 on the side of rear frame 28. The ram can also be utilized for lifting A-frame 41 and equalizer 51 when the ball and socket are being connected and disconnected.

In the embodiment of FIG. 7, the box 44 for steering arm 43 is pivotally mounted at the rear end of gooseneck 19, and a manually controlled actuator 71 is connected between the gooseneck and the front end of the box. The actuator can be controlled from the cab of the truck and can, for example, comprise a hydraulic ram or a screw. This embodiment provides a combination of automatic and manual steering for the rear of the trailer.

The invention has a number of important features and advantages. The trailer is self-steering, and the rear of the trailer is steered automatically around a turn, with the amount of steering varying in accordance with the sharpness of the turn. Manual steering is also provided in some embodiments to facilitate special maneuvers in either direction of travel. With the steering control mounted on the center line of the trailer, unwanted steering action is eliminated, and there is no tilting or rocking of the trailer as might occur if the automatic steering were controlled from the side of the trailer.

It is apparent from the foregoing that a new and improved trailer has been provided. While only certain presently preferred embodiments have been described in detail, as will be apparent to those familiar with the art, certain changes and modifications can be made without departing from the scope of the invention as defined by the following claims.

We claim:

1. In a self-steering trailer for use with a pulling vehicle: an elongated main frame pivotally connected toward the front end thereof in load supporting relation to the pulling vehicle, a subframe having ground engaging wheels toward one end thereof positioned toward the rear end of the main frame, means pivotally connecting the rear portion of the main frame to the subframe in load supporting relationship, a dolly having ground engaging wheels positioned toward the other end of the subframe, means pivotally connecting the subframe to the dolly in load supporting relationship, and steering means interconnecting the main frame and the dolly for automatically turning the dolly relative to the main frame in response to lateral movement of the rear end of the main frame to steer the rear of the trailer in accordance with said lateral movement, said steering means comprising an arm having two sections which can be shifted laterally of each other connected between the rear portion of the main frame and the dolly.

2. The trailer of claim 1 wherein the steering means comprises an A-frame pivotally connected at one end thereof to the rear portion of the main frame, and having a pair of arms at the other end thereof connected to the dolly.

3. The trailer of claim 2 including an arm of adjustable length connected between the rear portion of the main frame and the one end of the A-frame the arms at the other end of the A-frame being connected to the dolly by an equalizer having arms pivotally connected to the dolly and to the arms of the A-frame.

4. The trailer of claim 2 wherein the A-frame is connected to the main frame at a point on the longitudinal center line of the main frame.

5. The trailer of claim 2 including a manually controlled actuator connected between the main frame and the steering means for moving the A-frame relative to the main frame to turn the dolly and manually steer the rear of the trailer.

6. The trailer of claim 1 wherein the steering means includes a manually controlled actuator for turning the dolly to manually steer the rear of the trailer.

7. The trailer of claim 1 including a second subframe connected between the front of the main frame and the pulling vehicle, said second subframe having ground engaging wheels toward the rear thereof and having a forward portion pivotally connected to the pulling vehicle in load supporting relationship, the front portion of the main frame being pivotally connected to the second subframe in load supporting relationship.

8. In a self-steering trailer for use with a pulling vehicle having a fifth wheel: an elongated main frame having a central deck section with forwardly and rearwardly extending goosenecks toward the ends of said frame, a front subframe having ground engaging wheels toward the rear thereof and a forwardly extending portion connected to the fifth wheel of the pulling vehicle, means pivotally connecting the forwardly extending gooseneck of the main frame to the front subframe whereby the front portion of the main frame is supported by the front subframe, a dolly having ground engaging wheels positioned to the rear of the main frame, a rear subframe having ground engaging wheels toward the front thereof and a rearwardly extending portion pivotally connected to the dolly in load supporting relationship, means pivotally connecting the rearwardly extending gooseneck of the main frame to the rear subframe whereby the rear portion of the main frame is supported by the rear subframe, an A-frame having a pair of arms connected to the dolly toward opposite sides thereof, and a steering arm interconnecting the A-frame and the rearwardly extending gooseneck of the main frame, said steering arm being deflected by lateral movement of said gooseneck to turn the dolly about the pivotal connection with the rear subframe and thereby automatically steer the rear of the trailer in the direction of the lateral movement, and said A-frame having a pair of laterally displaceable sections which permit adjustment of the lateral position of the A-frame arms relative to the steering arm.

9. The trailer of claim 8 wherein the length of the steering arm is adjustable, and the A-frame is connected to the dolly by an equalizer having a first pair of pivot pins interconnecting the steering arm and the equalizer and a second pair of pivot pins interconnecting the equalizer and the dolly.

10. The trailer of claim 8 wherein the steering arm is connected to the rear gooseneck of the main frame at a point on the longitudinal center line of the main frame.

11. The trailer of claim 8 including a manually controlled actuator connected between the A-frame and the dolly for turning the dolly to manually steer the rear of the trailer.

12. The trailer of claim 8 including a manually controlled actuator connected between the main frame and the steering arm for deflecting the arm to turn the dolly and steer the rear of the trailer.

13. The trailer of claim 12 wherein the steering arm is pivotally mounted on the gooseneck and the manually controlled actuator determines the position of said arm.

14. In a self-steering trailer for use with a pulling vehicle: an elongated main frame pivotally connected toward the front end thereof in load supporting relation to the pulling vehicle, a subframe having ground engaging wheels toward one end thereof positioned toward the rear end of the main frame, means pivotally connecting the rear portion of the main frame to the subframe in load supporting relationship with the dolly being rotatable relative to the subframe about a vertically extending axis, steering means interconnecting the main frame and the dolly for automatically turning the dolly about the axis in response to lateral movement of the rear end of the main frame to steer the rear of the trailer in accordance with said lateral movement, and means including a manually controlled actuator for pivoting the dolly about the vertically extending axis to further steer the rear of the trailer.

15. The trailer of claim 14 wherein the steering means includes an A-frame connected to the dolly rearwardly of the pivot axis and a steering arm extending rearwardly from the main frame and connected to the A-frame.

16. The trailer of claim 15 wherein the steering arm is detachably coupled to the A-frame, and the manually controlled actuator is connected between the subframe and the dolly.

17. The trailer of claim 15 wherein the steering arm is pivotally connected to the main frame, and the manually controlled actuator is connected between the main frame and the steering arm.

* * * * *